(12) United States Patent
Kogan

(10) Patent No.: US 11,207,784 B2
(45) Date of Patent: Dec. 28, 2021

(54) HAND-HELD ROBOT OPERATING DEVICE COMBINATION COMPRISING A BASIC-CONTROL POSITION SENSOR

(71) Applicant: KUKA Deutschland GmbH, Augsburg (DE)

(72) Inventor: Yevgen Kogan, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 203 days.

(21) Appl. No.: 16/311,929

(22) PCT Filed: Jun. 20, 2017

(86) PCT No.: PCT/EP2017/065126
§ 371 (c)(1),
(2) Date: Dec. 20, 2018

(87) PCT Pub. No.: WO2017/220605
PCT Pub. Date: Dec. 28, 2017

(65) Prior Publication Data
US 2019/0210228 A1 Jul. 11, 2019

(30) Foreign Application Priority Data
Jun. 23, 2016 (DE) ...................... 10 2016 211 244.9

(51) Int. Cl.
*G05B 15/00* (2006.01)
*B25J 13/02* (2006.01)
*B25J 13/08* (2006.01)

(52) U.S. Cl.
CPC ............. *B25J 13/02* (2013.01); *B25J 13/088* (2013.01)

(58) Field of Classification Search
CPC ... B25J 13/02; B25J 13/088; B25J 3/00; B25J 9/1674; C08L 19/00; H04M 1/21
(Continued)

(56) References Cited

U.S. PATENT DOCUMENTS

| 7,519,218 | B2 * | 4/2009 | Takemoto | ............ | G02B 27/017 |
| | | | | | 382/165 |
| 2003/0227440 | A1 * | 12/2003 | Fager | .................... | G01S 5/0247 |
| | | | | | 345/156 |

(Continued)

FOREIGN PATENT DOCUMENTS

| CN | 201171897 Y | 12/2008 |
| CN | 101758499 A | 6/2010 |

(Continued)

OTHER PUBLICATIONS

DE102010025781A1.English.translation (Year: 2012).*

(Continued)

*Primary Examiner* — B M M Hannan
(74) *Attorney, Agent, or Firm* — Bachman & LaPointe, P.C.

(57) ABSTRACT

A hand-held robot operating device combination has: an autonomous safety-related basic control device that includes a housing, a safety-relevant switching means on the housing, and a communication device for connecting the autonomous safety-related basic control device for control purposes to a controller of a robot; an autonomous mobile terminal that includes a terminal controller and at least one terminal position sensor designed to sense positional data in respect of the autonomous mobile terminal in at least one of the degrees of freedom thereof; and a holder designed to mechanically connect the autonomous safety-related basic control device to the autonomous mobile terminal in a manually detachable combined arrangement so as to form the hand-held robot operating device combination; the autonomous safety-related basic control device includes at least one basic-control position sensor which is designed to sense positional data in respect of the autonomous safety- (Continued)

related basic control device in at least one degrees of freedom thereof.

15 Claims, 3 Drawing Sheets

(58) Field of Classification Search
USPC .................................................. 700/258, 264
See application file for complete search history.

(56) References Cited

U.S. PATENT DOCUMENTS

| | | | |
|---|---|---|---|
| 2005/141681 A1 | 6/2005 | Graiger | |
| 2013/0076865 A1* | 3/2013 | Tateno | G06T 7/75 348/46 |
| 2013/0161967 A1* | 6/2013 | Jarrett | F16M 11/041 294/142 |
| 2014/0176418 A1* | 6/2014 | Ramachandran | G06T 7/80 345/156 |
| 2015/0057804 A1* | 2/2015 | Som | G06F 3/04883 700/264 |
| 2015/0066209 A1* | 3/2015 | Som | G05B 19/409 700/264 |
| 2015/0108282 A1* | 4/2015 | Kanaoka | G05D 1/0016 244/23 A |
| 2015/0174767 A1* | 6/2015 | Som | G05B 19/409 700/257 |
| 2016/0114478 A1* | 4/2016 | Wu | B25J 13/006 700/264 |
| 2016/0167238 A1* | 6/2016 | Matthews | B25J 9/0084 73/118.01 |
| 2019/0160686 A1* | 5/2019 | Riedel | G06F 3/04883 |

FOREIGN PATENT DOCUMENTS

| | | |
|---|---|---|
| CN | 101898318 A | 12/2010 |
| CN | 103502772 A | 1/2014 |
| CN | 104346911 A | 2/2015 |
| CN | 104918756 A | 9/2015 |
| CN | 105690384 A | 6/2016 |
| DE | 102010025781 A1 | 1/2012 |
| DE | 102011118310 A1 | 5/2012 |
| JP | 2007168067 A | 7/2007 |
| JP | 2016060018 A | 4/2016 |
| WO | 03088011 A2 | 10/2003 |
| WO | WO2011150440 * | 8/2011 ............. B25J 13/06 |

OTHER PUBLICATIONS

JP2016060018A.English.translation (Year: 2016).*
International Search Report for PCT/EP2017/065126, dated Sep. 20, 2017.
Chinese Office Action dated Aug. 4, 2021 for Chinese Patent Application No. 201780039180.6.

* cited by examiner

HAND-HELD ROBOT OPERATING DEVICE COMBINATION COMPRISING A BASIC-CONTROL POSITION SENSOR

BACKGROUND OF THE INVENTION

The invention relates to a hand-held robot operating device combination, having an autonomous safety-related basic-control apparatus which has a housing, a safety-related switching means arranged on the housing and a communication apparatus for connecting the mobile safety-related basic-control apparatus for control purposes to a robot controller of a robot, an autonomous mobile terminal having a terminal controller and at least one terminal position sensor which is designed to capture position information from the mobile terminal in at least one of its degrees of freedom, and a holder which is designed to mechanically connect the safety-related basic-control apparatus to the mobile terminal in a manually detachable combined arrangement in order to form the hand-held robot operating device combination.

WO 03/088011 A2 describes a mobile electronic computing unit which can be held in one hand, particularly in the manner of a Personal Data Assistant (PDA) or handheld computer, with a software-controlled processor unit, at least one storage apparatus connected to said processor unit for storing software modules to be executed and/or data to be processed, at least one display apparatus for the visually discernible output of information and with at least one input apparatus at least for influencing the operating functions of the computing unit and/or for inputting data, wherein the display apparatus and input apparatus are structurally overlaid or functionally combined in the manner of a touch-sensitive screen, for example in the form of a touchscreen, and with at least one interface designed as standard on the housing of the computing unit, said interface being provided for connection to peripheral, electronic or electrical devices, such as e.g. a personal computer, wherein the interface designed as standard or an autonomously designed interface is provided for connection to at least one safety switching element in the form of an emergency off switch and/or an enabling switch.

DE 10 2010 025 781 A1 describes a portable safety input device with at least one input means for inputting a safety signal onto a robot controller which has an interface for communication with a handset connected, in particular detachably, to the safety input device to control a robot by means of communication with this robot controller.

SUMMARY OF THE INVENTION

The object of the invention is to produce a hand-held robot operating device combination in which a unique and technically safe assignment of the mobile safety-related basic-control apparatus and the mobile terminal can be achieved.

The object of the invention is achieved by a hand-held robot operating device combination, having:
an autonomous safety-related basic-control apparatus having a housing, a safety-related switching means arranged on the housing and a communication apparatus for connecting the mobile safety-related basic-control apparatus for control purposes to a robot controller of a robot,
an autonomous mobile terminal having a terminal controller and at least one terminal position sensor which is designed to capture positional information from the mobile terminal in at least one of its degrees of freedom,
and a holder which is designed to mechanically connect the safety-related basic-control apparatus to the mobile terminal in a manually detachable combined arrangement in order to form the hand-held robot operating device combination, wherein the safety-related basic-control apparatus has at least one basic-control position sensor which is designed to capture positional information from the mobile safety-related basic-control apparatus in at least one of its degrees of freedom.

A unique assignment, i.e. the presence of a fixed mechanical coupling of the mobile safety-related basic-control apparatus and the mobile terminal can therefore be established in that, on the one hand, first information relating to the instantaneous position of the mobile safety-related basic-control apparatus is obtained and, on the other hand, second information relating to the instantaneous position of the mobile terminal is obtained and the first information can then be compared with the second information in order to be able to establish whether both the safety-related basic-control apparatus and the mobile terminal are subjected to the same positional change. In this respect, it can be established whether the safety-related basic-control apparatus and the mobile terminal move synchronously with one another in the same manner, thus indicating that the safety-related basic-control apparatus and the mobile terminal are mechanically rigidly coupled and thus form a hand-held operating device combination.

The safety-related basic-control apparatus may, in particular, be a mobile safety-related basic-control apparatus. Alternatively, the safety-related basic-control apparatus may also be a stationary safety-related basic-control apparatus.

Generally speaking, safety-related devices, such as stop switches, enabling switches, etc., can be provided which can be coupled via the safety-related basic-control apparatus and, if necessary, via a secure communication connection for robot control in order to be able to intervene in the event of a critical action on the robot initiated by the input device.

The safety-related basic-control apparatus can have at least one safety-related switching means which may be an emergency stop triggering means, at least one enabling device, and/or at least one operating mode selection means. In addition, the safety-related basic-control apparatus can also have a display means, in particular an electronic display. At least the at least one emergency stop triggering means, the at least one enabling device and/or the at least one operating mode selection means can be connected for control purposes, using safe technology, to a robot controller of a robot to control said robot and can, in particular, communicate with said controller. The safety-related basic-control apparatus is designed as an autonomous safety-related basic-control apparatus which can control the robot with its basic functions even without being connected for control purposes to the mobile terminal, in fact via a secure connection to the robot controller which can be configured by the communication apparatus of the safety-related basic-control apparatus. The safety-related basic-control apparatus can furthermore also have at least one non-safety-related switching means.

The at least one basic-control position sensor and the at least one terminal position sensor do not necessarily have to capture or measure the same physical quantity. It suffices if it can be inferred from the position information from the mobile safety-related basic-control apparatus and the position information from the mobile terminal that both devices or apparatuses are dependent on one another in their respective positions in space.

"Position in space" is understood, particularly in relation to the terms "position sensor" and "position information", to mean that one or more physical quantities are involved which may be the positions of the object (safety-related basic-control apparatus and mobile terminal) in space (Cartesian spatial directions X, Y and Z), the orientations of the object in space (Cartesian rotations around the spatial axes A, B and C), and all their mathematical derivations, such as speeds (X', Y', Z', A', B', C') or accelerations (X'', Y'', Z'', A'', B'', C'').

In all design variants of sensor types, the basic-control position sensor can be designed specifically to capture the position information from the mobile safety-related basic-control apparatus in at least one of its degrees of freedom which is the same degree of freedom in which the terminal position sensor also captures the position information from the mobile terminal. As a result, a comparison can be made in the simplest manner without separate recalculations having to be performed.

The respective position sensors of the mobile safety-related basic-control apparatus and the mobile terminal can capture or measure different physical quantities. The safety-related basic-control apparatus can also have two or more position sensors which either capture the same physical quantity or capture different physical quantities. The respective position sensor may thus, for example, be a position sensor, an orientation sensor, but also a magnetic field sensor, a gyroscope and/or an optical sensor.

The terminal position sensor may correspondingly be a terminal magnetic field sensor which is designed to capture magnetic field information relating to the mobile terminal in at least one of its degrees of freedom, and/or the basic-control position sensor may be a basic-control magnetic field sensor which is designed to capture magnetic field information relating to the mobile safety-related basic-control apparatus in at least one of its degrees of freedom.

Alternatively or additionally to a magnetic field sensor, the terminal position sensor may also be a terminal optical sensor which is designed to capture image information recordable from the mobile terminal in at least one of its degrees of freedom, and/or the basic-control position sensor may be a basic-control optical sensor which is designed to capture image information recordable from the mobile safety-related basic-control apparatus in at least one of its degrees of freedom.

The basic-control optical sensor and/or the terminal optical sensor may, for example, be a camera which captures an image from the environment, in fact from a position which is located on the mobile safety-related basic-control apparatus or on the mobile terminal. The camera can be designed specifically, for example, to capture or measure an optical flow. Information, for example, relating to the movement, in particular the speed and/or the acceleration of the object (safety-related basic-control apparatus or mobile terminal) connected to the camera can then be determined from the optical flow.

If, for example, on the one object (safety-related basic-control apparatus or mobile terminal device), a rotation of the object around a specific Cartesian spatial axis can be established from the optical flow, it is possible, for example, by means of a magnetic field sensor or a gyroscope on the other object (mobile terminal or safety-related basic-control apparatus), to determine the rotation of said object for the same Cartesian spatial axis. A comparison then produces the result of a mechanical coupling if the rotation of the one object determined by the optical flow matches the rotation of the other object determined by the magnetic field sensor or by the gyroscope on the other object. The position information does not necessarily need to be measured in a quantitatively precise manner. Instead, it is in some instances already sufficient if only the temporal match of the changes to both objects can be established.

Alternatively or additionally to a magnetic field sensor and/or an optical sensor, the terminal position sensor may, in particular, be a terminal acceleration sensor which is designed to capture acceleration information from the mobile terminal in at least one of its degrees of freedom, and/or the basic-control position sensor may be a basic-control acceleration sensor which is designed to capture an acceleration of the mobile safety-related basic-control apparatus in at least one of its degrees of freedom. The terminal device position sensor may, for example, also be a gravitational sensor or a gravitational field sensor.

The holder may generally be a separate component. Alternatively, the holder may be a part of the mobile safety-related basic-control apparatus and/or a part of the mobile terminal, or the holder may be designed on the mobile safety-related basic-control apparatus and/or on the mobile terminal.

In one specific design variant, the hand-held robot operating device combination can have:

an autonomous safety-related basic-control apparatus which has a housing, a safety-related switching means, in particular an emergency stop switching means, an enabling switch and/or an operating mode selection switch, arranged on the housing and a communication apparatus for connecting the mobile safety-related basic-control apparatus for control purposes to a robot controller of a robot, an autonomous mobile terminal which has a terminal controller and at least one terminal acceleration sensor which is designed to measure an acceleration of the mobile terminal in at least one of its degrees of freedom, and a holder which is designed to mechanically connect the safety-related basic-control apparatus in a manually detachable combination arrangement in order to form the hand-held robot operating device combination, wherein the safety-related basic-control apparatus has at least one basic-control acceleration sensor which is designed to measure an acceleration of the mobile safety-related basic-control apparatus in at least one of its degrees of freedom which is the same degree of freedom in which the terminal acceleration sensor also measures the acceleration of the mobile terminal.

The safety-related basic-control apparatus can have at least one emergency stop triggering means, at least one enabling device, at least one operating mode selection means and/or a display means, in particular an electronic display. At least the at least one emergency stop triggering means, the at least one enabling device and/or the at least one operating mode selection means can be connected for control purposes, using safe technology, to a robot controller of a robot to control said robot and can, in particular, communicate with said controller. The safety-related basic-control apparatus is designed as an autonomous safety-related basic-control apparatus which can control the robot with its basic functions even without being connected to the mobile terminal for control purposes, in fact via a secure connection to the robot controller which can be configured by the communication apparatus of the safety-related basic-control apparatus.

The safety-related basic-control apparatus is correspondingly an apparatus which is separate from the robot controller and the robot and can be hand-held and possibly carried around by a robot operator, i.e. is correspondingly mobile. In a design of this type, the safety-related basic-control apparatus is therefore not only designed and/or configured to control the robot when the mobile terminal is connected mechanically and for control purposes to the safety-related basic-control apparatus, but is also designed and/or configured to control the robot when the mobile terminal is distanced, in particular is removed, from the safety-related basic-control apparatus. In such a case, a certain scope of the basic-control functions can be controlled via input means which form part of the safety-related basic-control apparatus. This may, in particular, be the already mentioned emergency stop triggering means, the enabling device and/or the operating mode selection means.

Additional functions of the robot or robot controller can be controlled via the mobile terminal, in particular its input means, such as a touchscreen, if the mobile terminal is connected for control purposes to the robot controller and therefore to the robot. Since the mobile terminal with the safety-related basic-control apparatus is intended to form a unique hand-held robot operating device combination, it must be ensured that the mobile terminal is connected not only for control purposes but also mechanically to the mobile safety-related basic-control apparatus. In order to ensure that only the mobile terminal which is mechanically coupled to the safety-related basic-control apparatus is connected for control purposes to the mobile safety-related basic-control apparatus, it is intended to be automatically determinable whether the mobile terminal device is mechanically coupled or is not mechanically coupled to the mobile safety-related basic-control apparatus.

Since the safety-related basic-control apparatus has at least one basic-control acceleration sensor which is designed to measure an acceleration of the mobile safety-related basic-control apparatus in at least one of its degrees of freedom which is the same degree of freedom in which the terminal acceleration sensor also measures the acceleration of the mobile terminal, it can be established whether both the mobile terminal and the safety-related basic-control apparatus are subjected to the same accelerations. If the mobile terminal and the safety-related basic-control apparatus are subjected to the same accelerations, it can be assumed that the mobile terminal is actually mechanically coupled to the mobile safety-related basic-control apparatus. If the mobile terminal and the safety-related basic-control apparatus are exposed to accelerations which differ from one another, it is clear that the mobile terminal is mechanically independent from the mobile safety-related basic-control apparatus and no mechanical coupling therefore exists between the mobile terminal and the mobile safety-related basic-control apparatus.

Since the intended use of the mobile safety-related basic-control apparatus and correspondingly the hand-held robot operating device combination also consists in said combination being hand-held by a person, it can be assumed that, when in use, the safety-related basic-control apparatus and correspondingly the hand-held robot operating device combination also are more or less constantly in motion and acceleration forces can therefore be continuously measured. In the case of a manual operation, it can thus be assumed that, in the case where the same acceleration forces are measured on both the mobile terminal and the mobile safety-related basic-control apparatus at the same times, these two device combination components (mobile terminal and safety-related basic-control apparatus) form a mechanically permanently connected unit. This is the case if the mobile terminal is mechanically coupled to the safety-related basic-control apparatus, as is also provided according to its intended use. This does not affect a possible exclusive use of the mobile safety-related basic-control apparatus connected for control purposes to the robot controller, which may be possible even without the use of a mobile terminal. It can merely be ruled out that a mobile terminal which is not properly mechanically coupled to its assigned safety-related basic-control apparatus would be permitted to control safety-critical states, in particular to move the robot. However, a mobile terminal mechanically detached from the mobile safety-related basic-control apparatus can continue to be used to control safety-uncritical states and functions, such as, for example, being able to read information relating to the robot, for example values relating to specific system states of the robot, from a screen of the mobile terminal.

Most conventional mobile terminals, such as, for example, tablet PCs or smartphones, have one or more acceleration sensors which are normally used to detect the orientation of the screen rotation and adjust it accordingly. It is proposed to provide identical, corresponding or similar acceleration sensors on the mobile safety-related basic-control apparatus or on the holder also, in particular to install them there so that at least one acceleration sensor is present in each case in each operating device part of the hand-held robot operating device combination. If both device parts which are logically assigned to one another are then mechanically joined to or interlinked with one another, both sensor sets measure the same accelerations except for the possibly present deviations/differences in the position or orientation, which can be established and taken into account if necessary via a one-off calibration. If the measurements are therefore identical or virtually identical, it can be assumed that both devices are joined to or interlinked with one another. If the measurements are clearly different, it must be assumed that the devices are not joined to or interlinked with one another and, for example, the incorrect mobile terminal has been mechanically coupled via the holder to the mobile safety-related basic-control apparatus.

The measured values can be compared whenever a signal change is established. It can, in particular, therefore also be recognized that the devices are again spatially separated, so that, for example, the logical assignment can then be revoked once more. It is possible here to exploit the fact that, with the physical separation of the devices, at least one device part must be moved so that different accelerations are measured in any event.

If one or both sensor sets are, for example, defective or faulty, it is highly improbable that the signal characteristics will then be identical over a certain time if the devices are not interlinked with one another, except in the case where the fault results in no measurements being carried out, although this can also be evaluated and recognized as a fault.

In all embodiments, the mobile terminal can accordingly have a program-controlled electronic computer, i.e. the terminal controller, in particular also a touch display and a program stored on the electronic computer which is designed to create robot programs and/or to control a robot, in particular to move a robot arm, and can be operated, for example, via the touch display. Generally speaking, a mobile terminal is understood to mean a portable communication device which can be used for voice and/or data communication regardless of the location. Mobile terminals may correspondingly be cell phones, smartphones, tablet PCs, netbooks and notebooks.

At least one from the group of terminal controller of the mobile terminal, mobile safety-related basic-control apparatus and robot controller can be designed to compare position information from the mobile terminal captured by the terminal position sensor with the position information from the mobile safety-related basic-control apparatus captured by the basic-control position sensor and, if the position information from the mobile terminal matches the position information from the mobile safety-related basic-control apparatus, to generate a signal characterizing the mechanical connection state of the mobile terminal and the mobile safety-related basic-control apparatus.

The terminal controller of the mobile terminal can be designed, for example, to forward acceleration values measured by the terminal acceleration sensor to the robot controller, the safety-related basic-control apparatus can be designed to forward acceleration values measured by the basic-control acceleration sensor via the communication apparatus to the robot controller and the robot controller can be configured to compare the acceleration values of the mobile terminal with the acceleration values of the mobile safety-related basic-control apparatus, and if the acceleration values of the mobile terminal match the acceleration values of the mobile safety-related basic-control apparatus, to generate a signal characterizing the mechanical connection state of the mobile terminal and the mobile safety-related basic-control apparatus.

The mobile terminal can then be activated on the basis of the generated signal in such a way that, for example, one or more functions of the robot, the robot controller or the robot program can be controlled by input means of the mobile terminal and/or can be monitored or displayed by output means, such as the screen of the mobile terminal. If a signal of this type is absent, the mobile terminal is not activated, or an already existing activation is ended and no functions whatsoever of the robot, the robot controller or the robot program can be performed by the input means of the mobile terminal. If necessary, the output means are then also activated in such a state and no displays are presented on the screen of the mobile terminal.

In the case of an existing mechanical connection state of the mobile terminal and the mobile safety-related basic-control apparatus established by the signal, the robot controller can be configured to permit a communication for robot control purposes between the mobile safety-related basic-control apparatus and the mobile terminal, and, in the case of a lacking mechanical connection state of the mobile terminal and the mobile safety-related basic-control apparatus established by the signal, the robot controller can furthermore be configured to prevent a communication for robot control purposes between the mobile safety-related basic-control apparatus and the mobile terminal.

The terminal controller of the mobile terminal can be designed to forward acceleration values measured by the terminal acceleration sensor to the safety-related basic-control apparatus, the safety-related basic-control apparatus can be designed to record acceleration values measured by the basic-control acceleration sensor and the safety-related basic-control apparatus can be configured to compare the acceleration values of the mobile terminal with the acceleration values of the mobile safety-related basic-control apparatus and, if the acceleration values of the mobile terminal match the acceleration values of the mobile safety-related basic-control apparatus, to generate a signal characterizing the mechanical connection state of the mobile terminal and the mobile safety-related basic-control apparatus.

The mobile terminal can then be activated here also on the basis of the generated signal in such a way that, for example, one or more functions of the robot, the robot controller or the robot program can be controlled by input means of the mobile terminal and/or can be monitored or displayed by output means, such as the screen of the mobile terminal. If a signal of this type is absent, the mobile terminal is not activated, or an already existing activation is ended and no functions whatsoever of the robot, the robot controller or the robot program can be performed by the input means of the mobile terminal. If necessary, the output means are then also activated in such a state and no displays are presented on the screen of the mobile terminal.

Alternatively, the terminal controller of the mobile terminal itself can be designed to compare acceleration values measured by the terminal acceleration sensor with the acceleration values of the mobile safety-related basic-control apparatus and, if the acceleration values of the mobile terminal match the acceleration values of the mobile safety-related basic-control apparatus, to generate a signal characterizing the mechanical connection state of the mobile terminal and mobile safety-related basic-control apparatus.

In the case of an existing mechanical connection state of the mobile terminal and the mobile safety-related basic-control apparatus established by the signal, the safety-related basic-control apparatus can be configured to permit a communication for robot control purposes between the mobile safety-related basic-control apparatus and the mobile terminal, wherein, in the case of a lacking mechanical connection state of the mobile terminal and the mobile safety-related basic-control apparatus established by the signal, the mobile safety-related basic-control apparatus is configured to prevent a communication for robot control purposes between the mobile safety-related basic-control apparatus and the mobile terminal.

It may essentially be possible, for example, for the mobile terminal to be mechanically connected to the mobile safety-related basic-control apparatus in a plurality of different orientations. A mobile terminal designed as a tablet PC can thus, for example, be attached, on the one hand, in the vertical format and, on the other hand, in the horizontal format to the mobile safety-related basic-control apparatus. This means that the at least one terminal acceleration sensor and the at least one basic-control acceleration sensor must first be coordinated with one another, i.e. an automatic assignment of the measurement directions, i.e. the measurement degrees of freedom, must be carried out, depending on the instantaneous spatial assignment, in particular following the coupling by the holder. This can be done by means of a calibration of the one acceleration sensor of the one device combination component in relation to the respective other acceleration sensor of the other device combination component.

The robot controller, the terminal controller and/or the safety-related basic-control apparatus can be configured accordingly to calibrate the basic-control position sensor in relation to the terminal position sensor. In particular, the robot controller, the terminal controller and/or the safety-related basic-control apparatus can be configured to calibrate the basic-control acceleration sensor in relation to the terminal acceleration sensor.

Alternatively or additionally, however, the robot controller, the terminal controller and/or the safety-related basic-control apparatus can also be configured accordingly to calibrate the terminal position sensor in relation to the basic-control position sensor. In particular, the robot controller, the terminal controller and/or the safety-related basic-control apparatus can be configured to calibrate the terminal acceleration sensor in relation to the basic-control acceleration sensor.

The at least one terminal position sensor can form part of an inertial measuring unit of the mobile terminal. In particular, the at least one terminal acceleration sensor can form part of an inertial measuring unit of the mobile terminal.

The at least one basic-control position sensor can form part of an inertial measuring unit of the mobile safety-related basic-control apparatus. In particular, the at least one basic-control acceleration sensor can form part of an inertial measuring unit of the mobile safety-related basic-control apparatus.

A respective inertial measuring unit can, for example, have three sensor elements aligned perpendicular to one other in the Cartesian space, each measuring a linear acceleration in the X-direction, Y-direction and Z-direction. In addition, for example, three further sensor elements aligned perpendicular to one other in the Cartesian space can be provided, each measuring a rotational acceleration around a X-axis of rotation, a Y-axis of rotation and a Z-axis of rotation.

The robot controller, the mobile terminal and/or the safety-related basic-control apparatus can be configured to compare the acceleration values of the mobile terminal with the acceleration values of the mobile safety-related basic-control apparatus and to generate a signal characterizing the mechanical connection state of the mobile terminal and the mobile safety-related basic-control apparatus whenever at least one of the terminal acceleration sensor and the basic-control acceleration sensor measures an acceleration of the mobile terminal and/or the mobile safety-related basic-control apparatus.

The basic-control acceleration sensor can be arranged on the housing of the mobile safety-related basic-control apparatus or on the holder connected to the mobile safety-related basic-control apparatus.

BRIEF DESCRIPTION OF THE DRAWINGS

A specific example embodiment of the invention is explained in detail in the following description with reference to the attached figures. Specific features of this typical example embodiment, where appropriate also considered individually or in further combinations, can also represent general features of the invention, regardless of the specific context in which they are mentioned.

In the figures.

DETAILED DESCRIPTION

Figure 1:
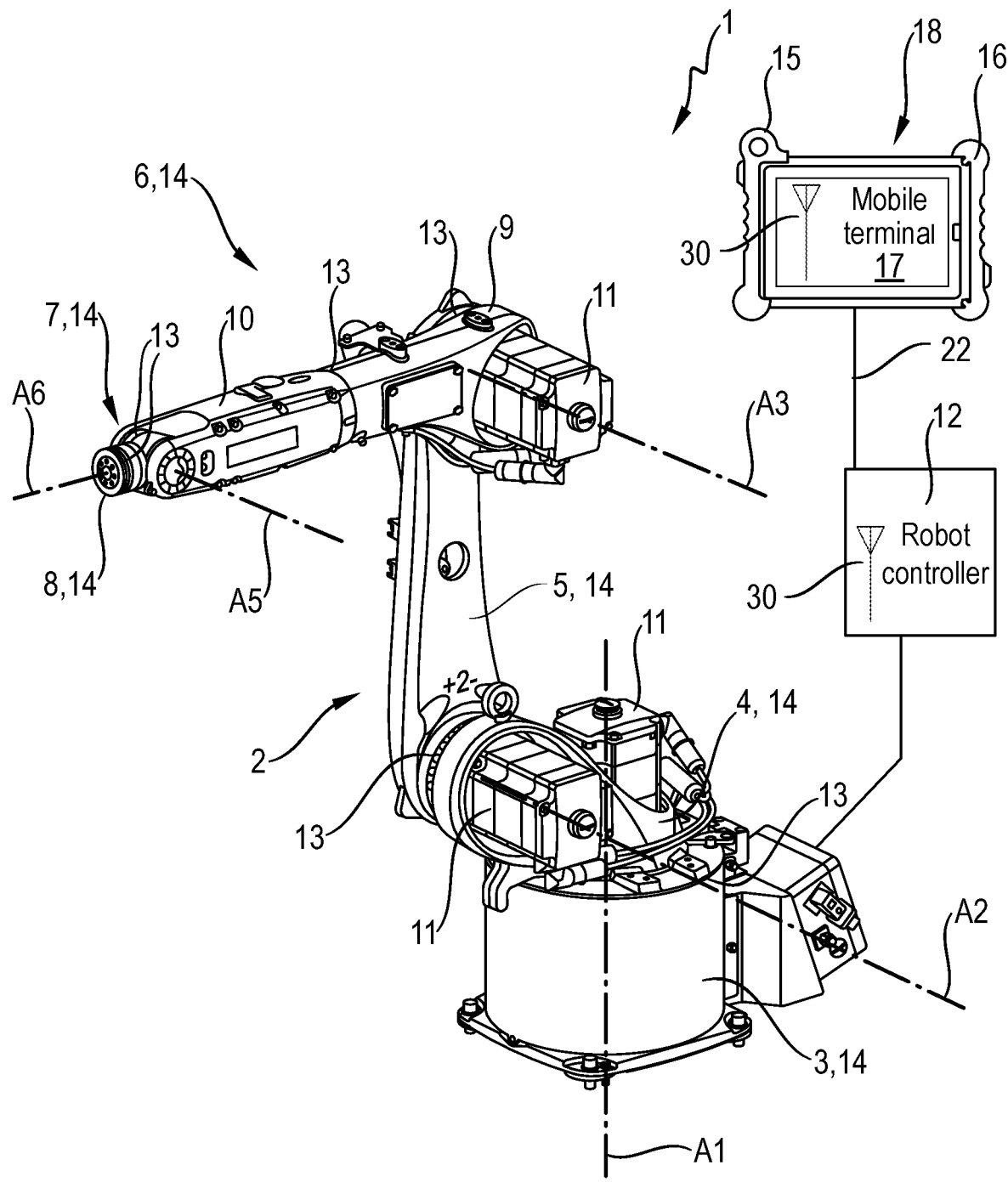
FIG. 1 shows a schematic representation of a robot having a robot arm and a robot controller, and also a hand-held robot operating device combination according to the invention consisting of a mobile safety-related basic-control apparatus and a mobile terminal.

FIG. 1 shows a robot 1 having a robot arm 2 and a robot controller 12. In the case of the present example embodiment, the robot arm 2 comprises a plurality of elements 14 arranged one after the other and connected by means of joints 13. The elements 14 are, in particular, a frame 3 and a carousel 4 mounted rotatably around a vertically running axis A1. In the case of the present example embodiment, further elements of the robot 2 are a swing arm 5, an arm jib 6 and a preferably multiaxial robot hand 7 with an attachment apparatus designed as a flange 8 to attach an end effector (not shown in detail). The swing arm 5 is mounted pivotably around a preferably horizontal axis of rotation at the lower end, e.g. on a swing arm bearing head (not shown in detail) on the carousel 4. The arm jib 6 is in turn mounted rotatably around a similarly preferably horizontal axis A3 at the upper end of the swing arm 5. On its end, said arm jib carries the robot hand 7 with its preferably three axes of rotation A4, A5, A6.

In the case of the present example embodiment, the arm jib 6 has an arm housing 9 mounted pivotably on the swing arm 5. A basic hand housing 10 of the arm jib 6 is mounted rotatably around the axis A4 on the arm housing 9.

The robot arm 2 is movable by means of three electric drive motors 11 in its three basic axes and by means of three further electric drive motors 11 in its three hand axes.

The robot controller 12 of the robot 1 is designed or configured to execute a robot program by means of which the joints 14 of the robot arm 2 can be automatically adjusted or rotated in an automated manner according to the robot program or in a manual operation. To do this, the robot controller 12 is connected to the controllable electric drive motors 11 which are designed to adjust the joints 14 of the robot arm 2. A safety-related basic-control apparatus 15, which is mobile in the case of the present example embodiment, is connected for control purposes to the robot controller 12. A mobile terminal 17 which is designed in the case of the example embodiment shown as a tablet PC is connected by means of a holder 16 shown by way of example, thus forming the hand-held robot operating device combination 18.

The robot controller 12 can be connected for control purposes via an, in particular separate, communication connection 30 to the mobile terminal 17.

Figure 2:
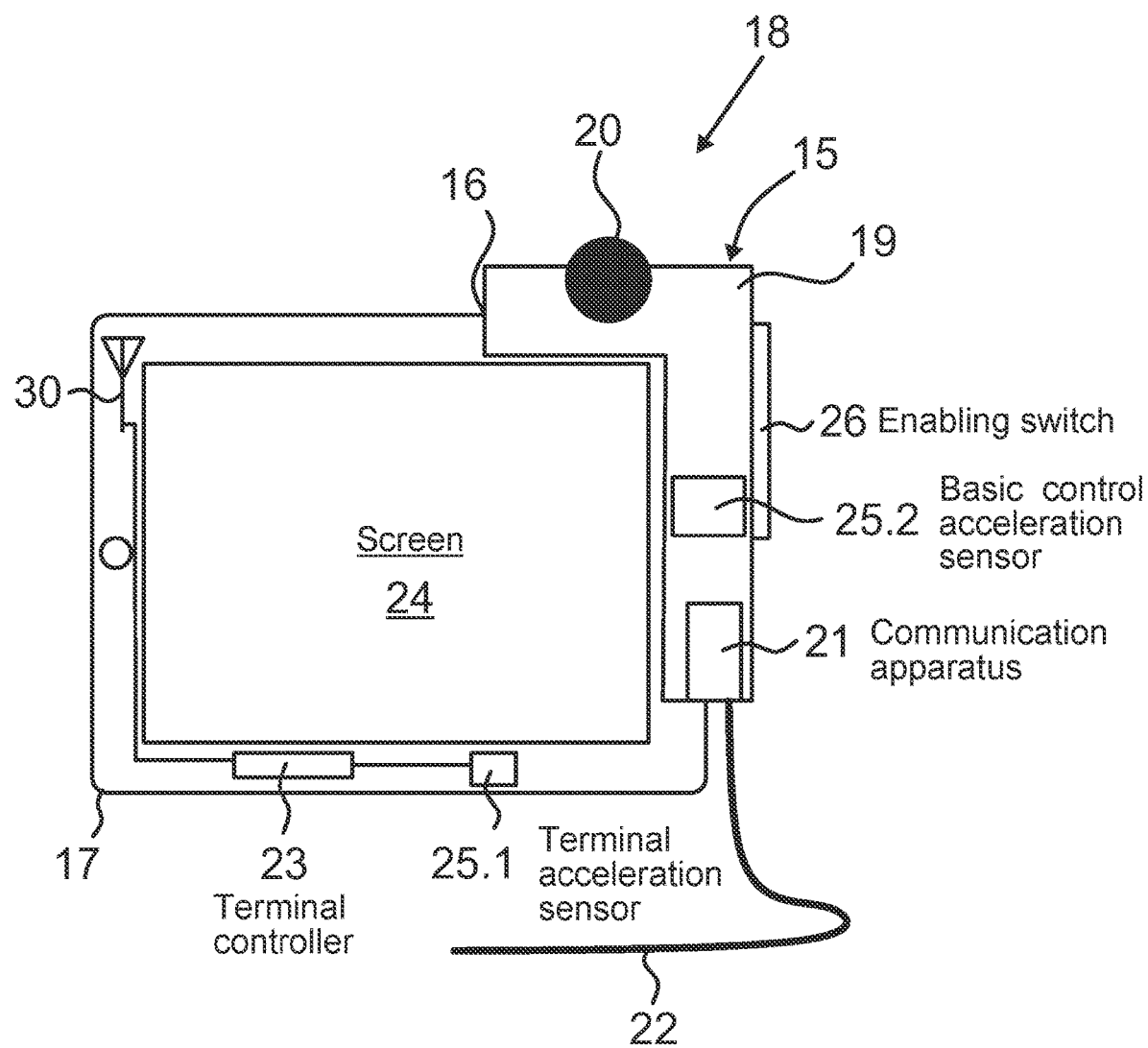
FIG. 2 shows a schematic representation of an example embodiment of a mechanically coupled hand-held robot operating device combination with a basic-control acceleration sensor according to the invention in a combined state.

FIG. 2 shows an example embodiment of the hand-held robot operating device combination 18. In this case, the hand-held robot operating device combination 18 comprises the autonomous mobile safety-related basic-control apparatus 15, the autonomous mobile terminal 17 and the holder 16.

The mobile safety-related basic-control apparatus 15 has a housing 19, an emergency stop switching means 20 arranged on the housing 19 and a communication apparatus 21 to connect the mobile safety-related basic-control apparatus 15 to the robot controller 12 for control purposes (FIG. 1), for example by means of the connection cable 22. The mobile safety-related basic-control apparatus 15 furthermore has an enabling switch 26.

The autonomous mobile terminal 17 has a terminal controller 23 and a screen 24.

Figure 3:
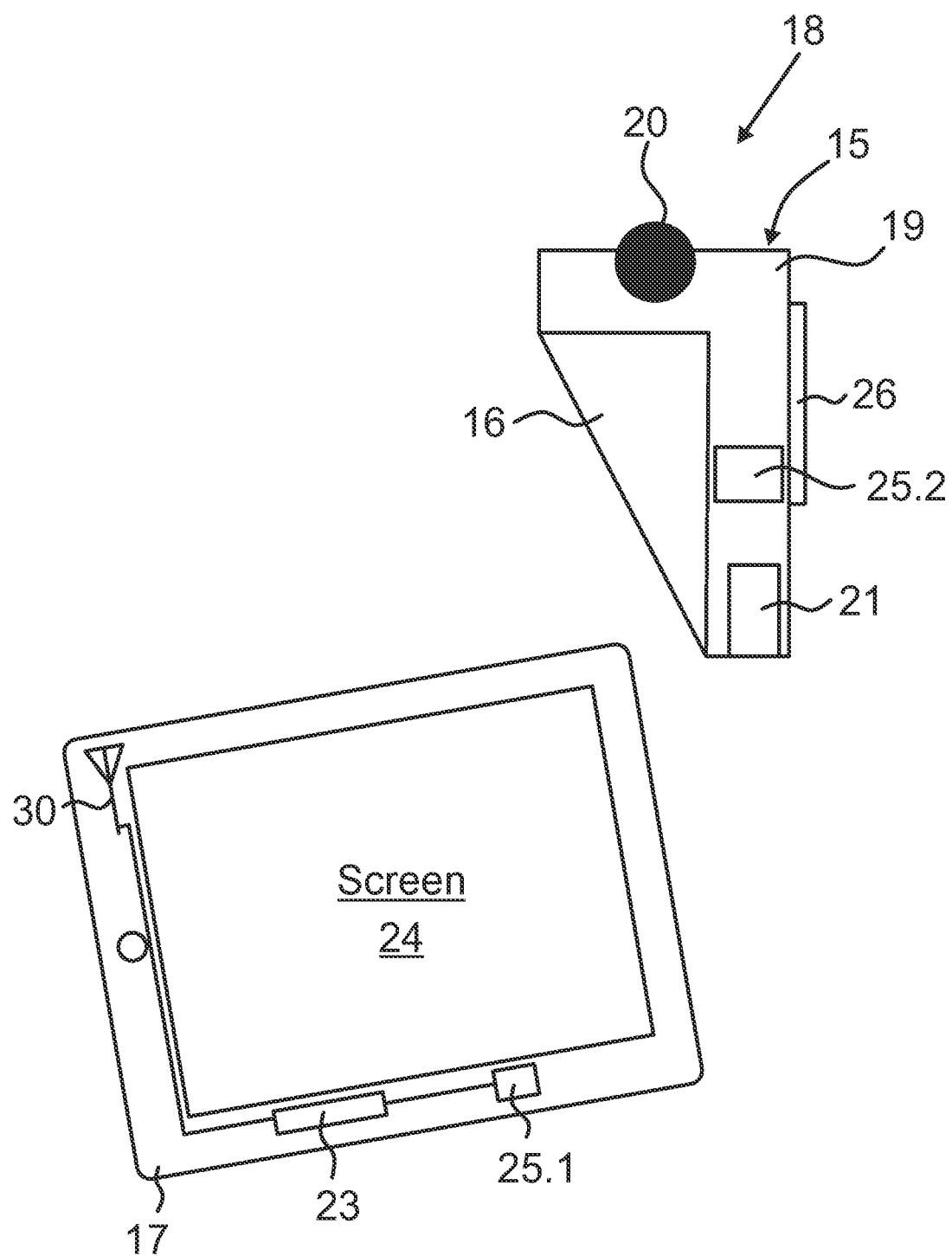
FIG. 3 shows a schematic sectional representation of the mechanically uncoupled hand-held robot operating device combination according to FIG. 2 in which the mobile terminal is mechanically separated from the mobile safety-related basic-control apparatus.

The holder 16 is designed to mechanically connect the mobile safety-related basic-control apparatus 15 to the mobile terminal 17 in a manually detachable connection arrangement, as shown in FIG. 2, in order to form the hand-held robot operating device combination 18. If the hand-held robot operating device combination 18 is detached, for example through a manual release of the holder 16, in such a way that the mobile terminal 17 is mechanically separated from the mobile safety-related basic-control apparatus 15, both the mobile terminal 17 and the mobile safety-related basic-control apparatus 15 are in each case operable autonomously and mechanically selfsufficiently and, for example, as shown in FIG. 3, can be positioned and oriented in each case independently from one another in space.

The hand-held robot operating device combination 18 accordingly has an autonomous mobile safety-related basic-control apparatus 15 having a housing 19, an emergency stop switching means 20 arranged on the housing 19 and a communication apparatus 21 to connect the mobile safety-related basic-control apparatus 15 to the robot controller 12 of the robot 1 for control purposes.

The hand-held robot operating device combination 18 comprises an autonomous mobile terminal 17 having a terminal controller 23 and at least one terminal acceleration sensor 25.1 which is designed to measure an acceleration of the mobile terminal 17 in at least one of its degrees of freedom.

The hand-held robot operating device combination 18 furthermore has a holder 16 which is designed to mechanically connect the mobile safety-related basic-control apparatus 15 to the mobile terminal 17 in a manually detachable connection arrangement, as shown in FIG. 2, in order to form the hand-held robot operating device combination 18.

According to the invention, the mobile safety-related basic-control apparatus 15 has at least one basic-control acceleration sensor 25.2 which is designed to measure an acceleration of the mobile safety-related basic-control apparatus 15 in at least one of its degrees of freedom which is the same degree of freedom in which the terminal acceleration sensor 25.1 also measures the acceleration of the mobile terminal 17.

The terminal controller 23 of the mobile terminal 17 is designed to forward acceleration values measured by the terminal acceleration sensor 25.1 to the robot controller 12, the mobile safety-related basic-control apparatus 15 is designed to forward acceleration values measured by the basic-control acceleration sensor 25.2 via the communication apparatus 21 to the robot controller 12 and the robot controller 12 is configured to compare the acceleration values of the mobile terminal 17 with the acceleration values of the mobile safety-related basic-control apparatus 15 and, if the acceleration values of the mobile terminal 17 match the acceleration values of the mobile safety-related basic-control apparatus 15, to generate a signal characterizing the mechanical connection state of the mobile terminal 17 and the mobile safety-related basic-control apparatus 15.

In the present example embodiment, in the case of an existing mechanical connection state of the mobile terminal 17 and the mobile safety-related basic-control apparatus 15 established by the signal (FIG. 2), the robot controller 12 is configured to permit a communication for robot control purposes between the mobile safety-related basic-control apparatus 15 and the mobile terminal 17, and, in the case of a lacking mechanical connection state of the mobile terminal 17 and the mobile safety-related basic-control apparatus 15 established by the signal (FIG. 3), is configured to prevent a communication for robot control purposes between the mobile safety-related basic-control apparatus 15 and the mobile terminal 17.

In the case of the present example embodiment, the terminal controller 23 of the mobile terminal 17 is designed to forward acceleration values measured by the terminal acceleration sensor 25.1 to the mobile safety-related basic-control apparatus 15, the mobile safety-related basic-control apparatus 15 is designed to record acceleration values measured by the basic-control acceleration sensor 25.2 and the mobile safety-related basic-control apparatus 15 is configured to compare the acceleration values of the mobile terminal 17 with the acceleration values of the mobile safety-related basic-control apparatus 15 and, if the acceleration values of the mobile terminal 17 match the acceleration values of the mobile safety-related basic-control apparatus 15, to generate a signal characterizing the mechanical connection state of the mobile terminal 17 and the mobile safety-related basic-control apparatus 15.

In the case of an existing mechanical connection state of the mobile terminal 17 and the mobile safety-related basic-control apparatus 15 established by the signal, the mobile safety-related basic-control apparatus 15 can be configured to permit a communication for robot control purposes between the mobile safety-related basic-control apparatus 15 and the mobile terminal 17 (FIG. 2) and, in the case of a lacking mechanical connection state of the mobile terminal 17 and the mobile safety-related basic-control apparatus 15 established by the signal, the mobile safety-related basic-control apparatus 15 can be configured to prevent a communication for robot control purposes between the mobile safety-related basic-control apparatus 15 and the mobile terminal 17 (FIG. 3).

The robot controller 12 and/or the mobile safety-related basic-control apparatus 15 can be configured to compare the acceleration values of the mobile terminal 17 with the acceleration values of the mobile safety-related basic-control apparatus 15 and to generate a signal characterizing the mechanical connection state of the mobile terminal 17 and the mobile safety-related basic-control apparatus 15 whenever at least one of the terminal acceleration sensor 25.1 and the basic-control acceleration sensor 25.2 measures an acceleration of the mobile terminal 17 and/or the mobile safety-related basic-control apparatus 15.

As shown in FIG. 2 and FIG. 3, the basic-control acceleration sensor 25.2 can be arranged on the housing 19 of the mobile safety-related basic-control apparatus 15 or alternatively on the holder 16 connected to the mobile safety-related basic-control apparatus 15.

The invention claimed is:

1. A hand-held robot operating device combination, having:
    an autonomous safety-related basic-control apparatus having a housing, a safety-related switching means arranged on the housing and a communication apparatus for connecting the autonomous safety-related basic-control apparatus for control purposes to a robot controller of a robot,
    an autonomous mobile terminal having a terminal controller and at least one terminal position sensor which is designed to capture positional information from the autonomous mobile terminal in at least one of its degrees of freedom, and
    a holder which is designed to mechanically connect the autonomous safety-related basic-control apparatus to the autonomous mobile terminal in a manually detachable combined arrangement in order to form the hand-held robot operating device combination,
    wherein:
    the autonomous safety-related basic-control apparatus has at least one basic-control position sensor which is designed to capture positional information from the autonomous safety-related basic-control apparatus in at least one of its degrees of freedom; and
    at least one from the group of the terminal controller of the autonomous mobile terminal, the autonomous safety-related basic-control apparatus, and the robot controller is designed to compare position information from the autonomous mobile terminal captured by the at least one terminal position sensor with the position information from the autonomous safety-related basic-control apparatus captured by the at least one basic-control position sensor and, when the position information from the autonomous mobile terminal matches the position information from the autonomous safety-related basic-control apparatus, to generate a signal characterizing a mechanical connection state of the autonomous mobile terminal and the autonomous safety-related basic-control apparatus.

2. The hand-held robot operating device combination as claimed in claim 1, wherein:
in a case of an existing mechanical connection state of the autonomous mobile terminal and the autonomous safety-related basic-control apparatus established by the signal, the robot controller is configured to permit a communication for robot control purposes between the autonomous safety-related basic-control apparatus and the autonomous mobile terminal, and, in the case of a lacking mechanical connection state of the autonomous mobile terminal and the autonomous safety-related basic-control apparatus established by the signal, the robot controller is configured to prevent the communication for robot control purposes between the autonomous safety-related basic-control apparatus and the autonomous mobile terminal.

3. The hand-held robot operating device combination as claimed in claim 1, wherein:
the at least one terminal position sensor is a terminal acceleration sensor which is designed to capture acceleration values from the autonomous mobile terminal in at least one of its degrees of freedom;
the at least one basic-control position sensor is a basic-control acceleration sensor which is designed to measure acceleration values of the autonomous safety-related basic-control apparatus in at least one of its degrees of freedom;
the terminal controller of the autonomous mobile terminal is designed to forward the acceleration values measured by the terminal acceleration sensor to the autonomous safety-related basic-control apparatus;
the autonomous safety-related basic-control apparatus is designed to record the acceleration values measured by the at least one basic-control acceleration sensor; and
the autonomous safety-related basic-control apparatus is configured to compare the acceleration values measured by the terminal acceleration sensor with the acceleration values measured by the at least one basic-control acceleration sensor and, when the acceleration values measured by the terminal acceleration sensor match the acceleration values measured by the at least one basic-control acceleration sensor, to generate a signal characterizing the mechanical connection state of the autonomous mobile terminal and the autonomous safety-related basic-control apparatus.

4. The hand-held robot operating device combination as claimed in claim 1, wherein:
the at least one terminal position sensor is a terminal acceleration sensor which is designed to capture acceleration values from the autonomous mobile terminal in at least one of its degrees of freedom;
the at least one basic-control position sensor is a basic-control acceleration sensor which is designed to measure acceleration values of the autonomous safety-related basic-control apparatus in at least one of its degrees of freedom;
the terminal controller of the autonomous mobile terminal is designed to compare the acceleration values measured by the terminal acceleration sensor with the acceleration values of the autonomous safety-related basic-control apparatus measured by the basic-control acceleration sensor and, when the acceleration values of the autonomous mobile terminal match the acceleration values of the autonomous safety-related basic-control apparatus, to generate a signal characterizing the mechanical connection state of the autonomous mobile terminal and autonomous safety-related basic-control apparatus.

5. The hand-held robot operating device combination as claimed in claim 1, wherein:
in a case of an existing mechanical connection state of the autonomous mobile terminal and the autonomous safety-related basic-control apparatus established by the signal, the autonomous safety-related basic-control apparatus is configured to permit a communication for robot control purposes between the autonomous safety-related basic-control apparatus and the autonomous mobile terminal and, in the case of a lacking mechanical connection state of the autonomous mobile terminal and the autonomous safety-related basic-control apparatus established by the signal, and the autonomous safety-related basic-control apparatus is configured to prevent the communication for robot control purposes between the autonomous safety-related basic-control apparatus and the autonomous mobile terminal.

6. The hand-held robot operating device combination as claimed in claim 1, wherein:
at least one of the robot controller, the terminal controller or the autonomous safety-related basic-control apparatus is configured to calibrate the at least one basic-control position sensor in relation to the at least one terminal position sensor.

7. The hand-held robot operating device combination as claimed in claim 1, wherein:
at least one of the robot controller, the terminal controller or the autonomous safety-related basic-control apparatus is configured to calibrate the at least one terminal position sensor in relation to the at least one basic-control position sensor.

8. The hand-held robot operating device combination as claimed in claim 1, wherein:
the at least one terminal position sensor forms part of an inertial measuring unit of the autonomous mobile terminal.

9. The hand-held robot operating device combination as claimed in claim 1, wherein:
the at least one basic-control position sensor forms part of an inertial measuring unit of the autonomous safety-related basic-control apparatus.

10. The hand-held robot operating device combination as claimed in claim 1, wherein:
the at least one basic-control position sensor is designed to capture the position information from the autonomous safety-related basic-control apparatus in at least one of its degrees of freedom which is the same degree of freedom in which terminal position sensor captures the position information from the autonomous mobile terminal.

11. The hand-held robot operating device combination as claimed in claim 1, wherein:
the at least one terminal position sensor is a terminal magnetic field sensor which is designed to capture magnetic field information relating to the autonomous mobile terminal in at least one of its degrees of freedom, or the at least one basic-control position sensor is a basic-control magnetic field sensor which is designed to capture magnetic field information relating to the autonomous safety-related basic-control apparatus in at least one of its degrees of freedom.

12. The hand-held robot operating device combination as claimed in claim 1, wherein:
the at least one terminal position sensor is a terminal optical sensor which is designed to capture image information recordable from the autonomous mobile terminal in at least one of its degrees of freedom, or the at least one basic-control position sensor is a basic-control optical sensor which is designed to capture image information recordable from the autonomous safety-related basic-control apparatus in at least one of its degrees of freedom.

13. A hand-held robot operating device combination, having:
an autonomous safety-related basic-control apparatus having a housing, a safety-related switching means arranged on the housing and a communication apparatus for connecting the autonomous safety-related basic-control apparatus for control purposes to a robot controller of a robot,
an autonomous mobile terminal having a terminal controller and at least one terminal position sensor which is designed to capture positional information from the autonomous mobile terminal in at least one of its degrees of freedom, and
a holder which is designed to mechanically connect the autonomous safety-related basic-control apparatus to the autonomous mobile terminal in a manually detachable combined arrangement in order to form the hand-held robot operating device combination,
wherein:
the autonomous safety-related basic-control apparatus has at least one basic-control position sensor which is designed to capture positional information from the autonomous safety-related basic-control apparatus in at least one of its degrees of freedom;
the at least one terminal position sensor is a terminal acceleration sensor which is designed to capture acceleration values of the autonomous mobile terminal from the autonomous mobile terminal in at least one of its degrees of freedom, and the at least one basic-control position sensor is a basic-control acceleration sensor which is designed to capture acceleration values of the autonomous safety-related basic-control apparatus in at least one of its degrees of freedom; and
at least one of the robot controller, the autonomous mobile terminal or the autonomous safety-related basic-control apparatus is configured to compare the acceleration values of the autonomous mobile terminal with the acceleration values of the autonomous safety-related basic-control apparatus and to generate a signal characterizing a mechanical connection state of the autonomous mobile terminal and the autonomous safety-related basic-control apparatus when the acceleration values of the autonomous mobile terminal measured by the terminal acceleration sensor matches with the acceleration values of the autonomous safety-related basic-control apparatus measured by the basic-control acceleration sensor.

14. The hand-held robot operating device combination as claimed in claim 13, wherein:
the at least one basic-control position sensor forms part of an inertial measuring unit of the autonomous safety-related basic-control apparatus.

15. A method for operating the hand-held robot operating device combination as claimed in claim 13, the method comprising:
said at least one of the terminal acceleration sensor and the at least one basic-control acceleration sensor respectively measuring said acceleration of said at least one of the autonomous mobile terminal or the autonomous safety-related basic-control apparatus;
said at least one of the robot controller, the autonomous mobile terminal or the autonomous safety-related basic-control apparatus comparing said acceleration values of the autonomous mobile terminal with said acceleration values of the autonomous safety-related basic-control apparatus; and
when the acceleration values of the autonomous mobile terminal measured by the at least one terminal acceleration sensor matches with the acceleration values of the autonomous safety-related basic-control apparatus measured by the at least one basic-control acceleration sensor, said at least one of the robot controller, the autonomous mobile terminal or the autonomous safety-related basic-control apparatus generating said signal characterizing the mechanical connection state of the autonomous mobile terminal and the autonomous safety-related basic-control apparatus.

* * * * *